United States Patent [19]
Simpson

[11] Patent Number: 4,754,553
[45] Date of Patent: Jul. 5, 1988

[54] ONE-MAN FIELD SURVEY INSTRUMENT

[76] Inventor: Ted Simpson, 231 Banbury Rd., Columbia, S.C. 29210

[21] Appl. No.: 853,392

[22] Filed: Apr. 18, 1986

[51] Int. Cl.$^4$ .............................................. G01C 9/12
[52] U.S. Cl. ..................................... 33/366; 33/1 H; 33/375; 33/390; 33/341; 33/355 R
[58] Field of Search ................. 33/365, 366, 521, 1 H, 33/338, 340, 341, 351–354, 375, 374, 391, 392, 355, 141.5

[56] References Cited
U.S. PATENT DOCUMENTS

| | | | |
|---|---|---|---|
| 231,799 | 8/1880 | Hergenroder | 33/352 X |
| 1,219,430 | 3/1917 | Bjornstad | 33/375 |
| 2,691,829 | 10/1954 | Arana | 33/374 |

FOREIGN PATENT DOCUMENTS

| | | | |
|---|---|---|---|
| 729629 | 12/1942 | Fed. Rep. of Germany | 33/1 H |
| 3114760 | 10/1982 | Fed. Rep. of Germany | 33/391 |

Primary Examiner—Harry N. Haroian
Attorney, Agent, or Firm—L. Lawton Rogers, III; Joseph M. Killeen

[57] ABSTRACT

A one-man field survey instrument for conducting small scale engineering surveys. The instrument automatically measures relative vertical and horizontal angles as it is moved over the terrain. The measurements are thereafter processed to prepare a topographical survey. Alternative configurations are disclosed as are methods for using the instrument.

13 Claims, 2 Drawing Sheets

ONE-MAN FIELD SURVEY INSTRUMENT

BACKGROUND OF THE INVENTION

The present invention relates generally to a survey instrument and methods for surveying. More particularly, the invention relates to a survey instrument for measuring elevational variations in local terrain, and two methods of conducting small scale engineering surveys.

Engineering surveys provide information for use in preparing topographical maps utilized in planning construction projects and other engineering related activities. In large scale surveys, aerial photography is commonly used, especially for mapping broad contour lines and similar details. For smaller scale surveys, various field instruments have been utilized with the selection of instrument depending usually upon the type of terrain involved and upon the quantity and quality of survey measurements needed.

In field surveys requiring accuracy of measurement a conventional instrument such as a transit is often used, frequently with an attached compass. The instrument with its tripod base is generally placed on the terrain over a known point by means of a plum bob or an optical plummet, and its telescope is aimed at a distant conventional range pole placed vertically on a second point of terrain. Range poles may include means such as disclosed in the Hein U.S. Pat. No. 723,526 dated Mar. 24, 1903, for facilitating vertical positioning of the rod or means such as disclosed in the Haun U.S. Pat. No. 3,685,162 dated Aug. 22, 1972, for positioning the rod vertically for an extended period on an uneven terrain surface.

Measurements generated by using a transit and range pole normally include (1) a vertical or elevational angle between the horizontal and a line from the transit to a known point on the range pole, (2) a horizontal angle or azimuth of the plane of the vertical angle relative to a selected compass heading, and (3) the approximate distance between the known point and the range pole, which is often determined by a steel tape of known length when accuracy is required.

Survey measurements thus generated may thereafter be analyzed to prepare a topographical map approximating features covered by the survey. The approximation may be presented, if desired, as a visual or coordinate display for purposes such as determining cuts and fills of land to be graded in which case a computing device, such as disclosed in the Hallisey U.S. Pat. No. 2,928,176 dated Mar. 15, 1960, may be utilized.

Although the transit and range pole are well known, they have various disadvantages when used in small scale engineering surveys. The survey information, although of high quality in terms of accuracy of vertical and horizontal angles, is time consuming and expensive to conduct, and normally requires at least two people and, preferably, a third person for recording information, especially if measurements are needed in large quantity with close spacing between measuring points. Also, the selection of measuring points may be limited by trees, rough terrain, structures, and other obstacles obscuring line of sight between the instrument and the range pole. And finally, in many small scale engineering surveys such as those involving landscape and landfill work or water flow analysis, high accuracy of angle measurements is not needed. Of more usefulness are measurements which may be obtained with relatively minimal time and expense, with close spacing between measuring points, and with little regard to obstacles present in the area to be surveyed.

Other known field survey instruments include the surveyor's compass and spirit level. However, because each of these instruments has a tripod base, the above described disadvantages in using a transit are not avoided and neither instrument has the measurement capability of a transit, i.e., a surveyor's compass measures only azimuthal angles and then not with the precision possible when using a transit, and a spirit level only measures vertical angles which limits its usefulness principally to measuring direct elevational differences between selected points of known spacing.

Still other known instruments include elevation meters such as those disclosed in the Eisler U.S. Pat. No. 2,613,449, dated Oct. 14, 1952, and grade measuring devices such as those disclosed in the the Bachfield U.S. Pat. No. 1,256,097 dated Feb. 12, 1918, the Werner U.S. Pat. No. 1,320,352, dated Oct. 28, 1919, the Noble U.S. Pat. No. 2,879,598 dated Mar. 31, 1959, and the Matsui U.S. Pat. No. 3,562,917 dated June 5, 1968. However, none of these instruments has the measuring capability of a transit.

It is accordingly an object of the present invention to obviate the above described deficiencies and provide a novel field survey instrument and methods of conducting a small scale engineering survey.

It is another object of the present invention to provide a field survey instrument and method for measuring both vertical and horizontal angles in relation to desired measuring points without the aid of additional instruments or a surveyor's assistant.

It is still another object of the present invention to provide a novel means and method for conducting a small scale engineering survey yielding reasonably accurate measurements of elevational variations in terrain in large quantity with reduced expense.

It is still a further object of the present invention to provide a rapid means and method for surveying local terrain with close spacing between survey measurments to provide a useful approximation of topographical features thereof.

It is still another object of the present invention to provide a simple means and method for surveying local terrain having obstacles to line of sight vision and unexpected variations in terrain elevation.

It is yet another object of the present invention to provide a means and method for measuring elevational variations in local terrain and rapidly recording and processing the measurements to provide a visual and coordinate display of topographical features for desired engineering purposes.

These and many other objects and advantages will be readily apparent to one skilled in the art to which the invention pertains from a perusal of the claims and the following detailed description of the preferred embodiments when read in conjunction with the appended drawings.

THE DRAWINGS

DETAILED DESCRIPTION OF PREFERRED EMBODIMENTS

Figure 1:
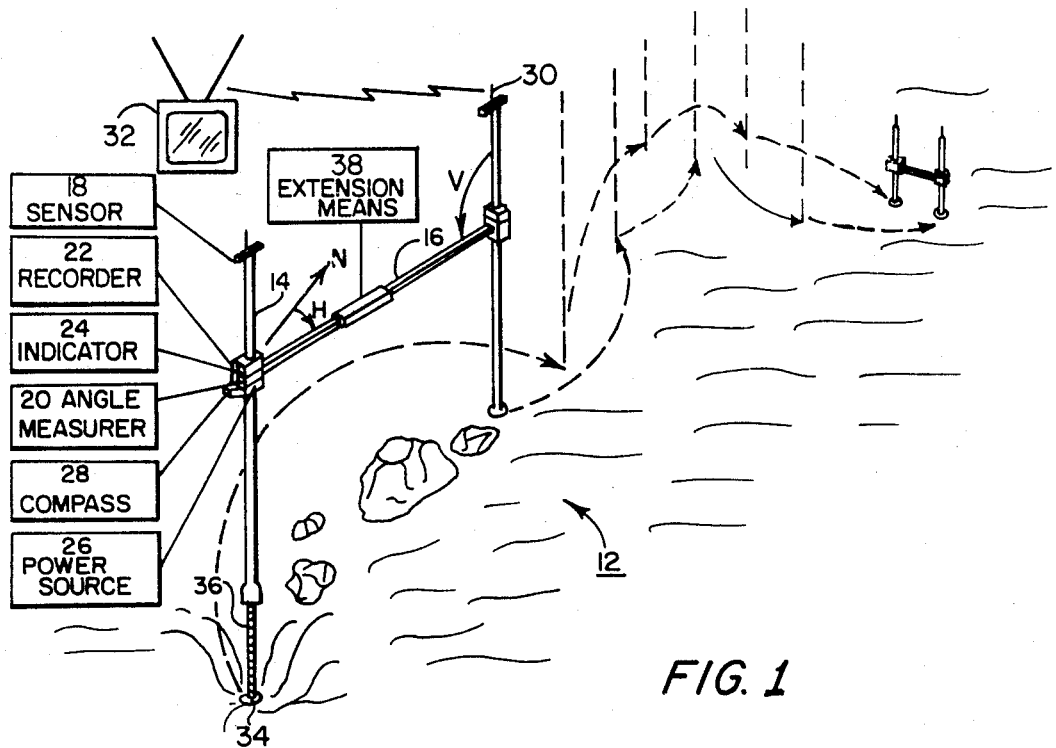
FIG. 1 is a pictorial view of a preferred embodiment of the present invention illustrating a terrain engaging structure with two terrain contacting legs.

With reference to the figures where like elements have been given like numbers to facilitate an understanding of the present invention, and particularly with reference to the embodiment of the present invention illustrated in FIG. 1, a terrain engaging structure 12 with two spaced-apart legs 14 is positioned with both legs 14 in vertical orientation and in contact with terrain. A crossbar linkage 16 is provided for coupling the legs 14 and maintaining them in parallel at all times regardless of movement of one leg 14 relative to the other.

A vertical sensing means 18 is carried on at least one leg 14 for sensing its vertical orientation and for providing an enabling signal responsively thereto. An electric angle measurer 20 is also carried on at least one leg 14 for measuring vertical and horizontal angles relative to the position of structure 12 in response to each enabling signal. One or more of the legs 14 may also have a recorder 22 for storing measurements, an indicator 24 for advising the operator of the instrument when measurements are made, and a source of electrical power 26 operatively coupled to the vertical sensing means 18, angle measurer 20, recorder 22, and indicator 24.

The instrument may also have a magnetic compass 28 so that horizontal angles may be measured in relation to a polar reference and thus be expressed in terms of azimuthal angles.

The instrument may also have an electronic transmitting means 30 operatively coupled to the power source 26 for transmitting recorded signals representing angle measurements to a remote data processor 32 which may be provided for processing the signals into a topographical map of terrain features. Processor 32 may alternatively be carried by the instrument if desired.

The structure 12 of the present invention, as illustrated in FIG. 1, is preferably small in size and light in weight so that it may be moved by one man across the terrain with one or the other of the two legs 14 always in contact with terrain. Also, crossbar linkage 16 is preferably a four-bar linkage attached to legs 14 by means of conventional rotational flanges which are sufficiently wide to maintain parallel leg alignment, and the bars themselves are preferably provided with sufficient torsional stiffness to restrain twisting.

The various support components of structure 12, i.e., vertical sensing means 18, angle measurer 20, recorder 22, indicator 24, power source 26, compass 28, transmitter 30, and data processor 32, may be any suitable conventional means. For example, the vertical sensing means 18 may comprise a spirit bubble or utilize a pendulum to achieve vertical orientation. Also, the sensor 18 may be automatic with an activation means which, when triggered, directs the component to emit an enabling signal to the angle measurer 20 automatically upon sensing vertical orientation of the leg 14 upon which it is carried. A manual or automatic switch responsive to the pressure of the leg 14 on the terrain may also be used to prevent spurious sampling. The angle measurer 20 may likewise be automatic with an activation means which, when triggered, directs the component to automatically measure a vertical angle and horizontal angle immediately upon receipt of an enabling signal from the vertical sensing means 18. Also, the power source 26 may be a self-contained battery or a re-energizable power source, the data processor 32 may be computerized, and the indicator 24 may be a flashing light, a bell, or the like.

With continued reference to FIG. 1, the vertical angle V may be measured as the angle between the linkage 16 and a selected leg 14 when positioned vertically. The horizontal angles H may be measured relative to the linkage 16 and a known reference point on a terrain spaced from the instrument or a predetermined point on a magnetic compass.

In a typical survey, one of the legs 14 is placed on a starting point of terrain to be surveyed. The other leg 14 is placed in contact with the terrain and both legs 14 are then positioned vertically. Upon achieving vertical orientation, the vertical sensing means 18 of the leg 14 positioned on the starting point provides an enabling signal that triggers the taking of angle measurements corresponding to the positioning of the legs 14 and the linkage 16. At the same time, the indicator 24 alerts the operator to the fact that measurements have been taken. The measurements may be stored in the recorder 22, and, if desired, they may also be transmitted to the data processor 32 to initiate processing. Of course, the first horizontal angle measured may be initialized to zero to facilitate subsequent processing of all horizontal angle measurements.

As further illustrated in FIG. 1, legs 14, after initial measurements having been taken, may be repeatedly swung one about the other to selected new positions. At each new position, the legs 14 are again positioned vertically and angle measurer 20 on the leg 14 about which the other leg 14 has been pivoted, upon receipt of an enabling signal, takes measurements for recording and optional transmission. Thus, as the survey proceeds with the operator selectively stalking the instrument about the terrain to be surveyed, it is possible to obtain an instantaneous read-out to develop an emerging visual or coordinate display of topographical information.

During the course of the survey, the instrument may be swung to a previous point of leg contact if evaluation of the accuracy of intervening measurements are desired. To facilitate the elevation, one leg 14 may be provided with a marking means 34 for designating a point of contact to which the instrument is to be returned. Other points of contact may also be marked if desired to provide the operator with an on-site visual indication of the developing course of the survey. Of course, the actual elevation of individual points of contact may be determined with reasonable accuracy if one of the measuring points coincides with a known point of elevation.

One or more of the legs 14 and/or crossbar linkage 16 may have telescoping means 36 and/or 38 for accommodating large variations in terrain. The length of the extension may be measured and automatically recorded by any conventional means along with corresponding angle measurements.

Figure 4:
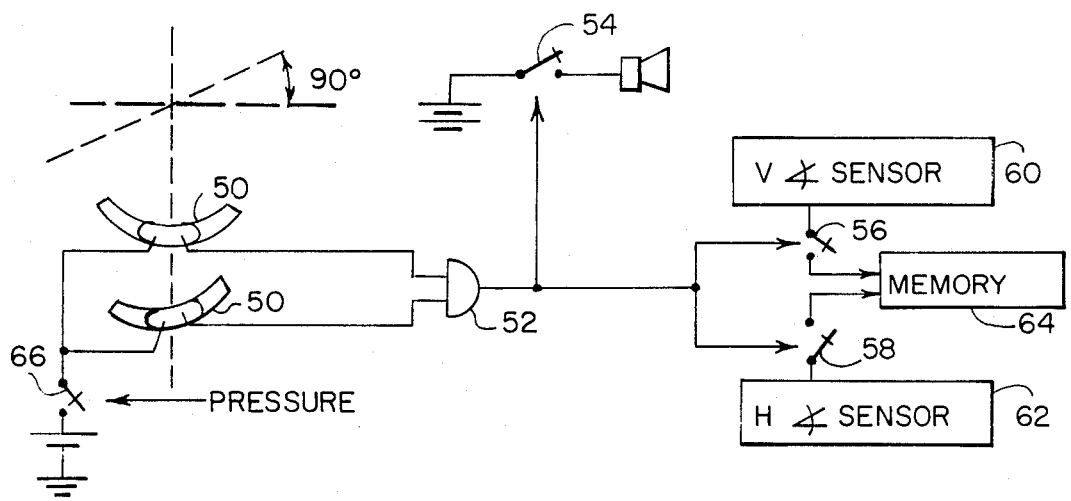
FIG. 4 is a schematic diagram illustrating the operation of the invention.

The operation of the invention may be more readily understood by reference to the schematic drawing of FIG. 4. As shown in FIG. 4, an enabling signal may be generated when the legs 14 pass through the vertical as sensed in any suitable conventional manner, e.g., by the simultaneous closure of orthogonally disposed mercury switches 50 as detected by an AND gate 52. The enabling signal may be used to audibly or visually indicate the "sample" condition by closure of the switch 54, and may be applied to switches 56 and 58 to sample and store the output signals from any suitable conventional angle sensors 60 and 62 in a conventional memory 64.

As shown in FIG. 4, power to the sensor used to sense the vertical condition of the legs 14 may be applied through a switch 66, manually operated or responsive to the engagement of both legs with the terrain. Thus, undesired sampling when the leg is being swung and happens to become vertical may be prevented.

The preferred embodiment illustrated in FIG. 1 may be modified in numerous ways without detracting from the invention. For example, compass 28 may be removed if measurement of horizontal angles in terms of azimuthal angles is not desired. Data processor 32 may be removed if rapid processing is not desired. Recorder 22 may be removed if manual recording of measurements is acceptable although, if the recorder 22 is absent, it may be preferable to provide angle measurer 20 with an on-the-spot means of visual read out. Of course, the leg extensible means 36 and linkage extension means 38, as well as terrain marker 34, may also be removed as can one of the angle measurers 20. If only one angle measurer 20 is used, measurements may be restricted to when the leg 14 with the angle measurer 20 is the pivot leg or, additional measurements may also be taken when the other leg (i.e., the leg without angle measurer 20) is the pivot leg as long as appropriate geometric correction is made in the additional measurements to take into account the position of the leg with the angle measurer 20.

Figure 2:
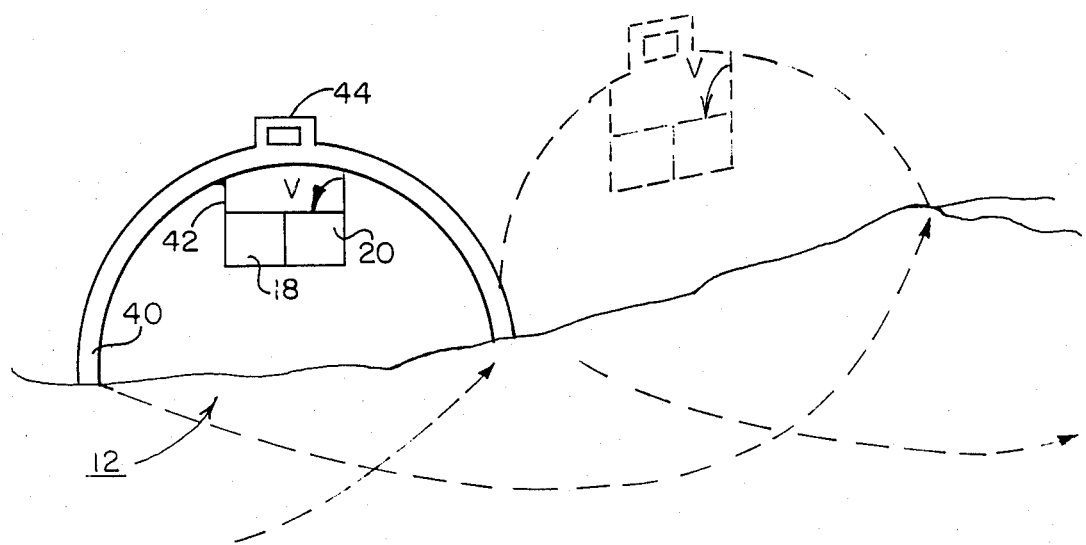
FIG. 2 is an elevation of an alternative embodiment of the present invention in cross-section illustrating a configured bar and freehanging connectors for supporting an angle measurer and vertical sensing means.

As illustrated in FIG. 2, the structure of the present invention may comprise a curved bar 40 configured to facilitate placement of its ends relative to the terrain. Preferably, the ends of the bar provide the reference points to be used in measuring the angles, although other reference points relative to the bar may alternatively be used. The vertical angle sensor 18 and horizontal sensor 20 may be coupled to the bar 40 by means of the parallel connectors 42 which allow the sensor 18 to hang freely below the bar 40 with the connectors 42 in vertical orientation to the terrain under the influence of gravity. It is desirable to restrict the angle measurer 20 to the plane of the bar 40 rather than to sense the departure therefrom. For this purpose, a spirit level or other suitable conventional instrument may be provided, with the sampling enabled manually or automatically in response thereto.

The instrument may be provided with a handle 44 to facilitate moving the structure 12 from one position of measurement to the next. A handle 44 provides the operator with added flexibility in taking measurements. When grasping the handle 44, the structure 12 may be moved from one measuring position to the next either by pivoting one end of the bar 40 about the other end or by simply picking up the instrument and moving it to the next position of measurement, as long as the ends of the bar 40 leave sufficient marks on the terrain to allow placing one end of the bar 40 in each position of measurement so that it coincides with the placement of one end of the bar in a previous position of measurement manual or pressure switches on the ends of the bar 40.

Figure 3:
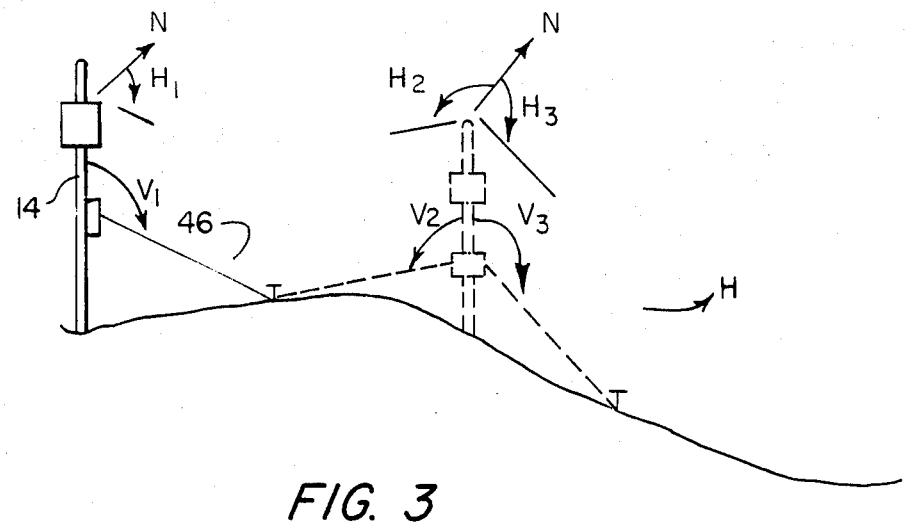
FIG. 3 is an elevation of yet another embodiment of the present invention in cross-section illustrating a structure with one terrain contacting leg and a terrain reference means.

As illustrated in FIG. 3, the structure of the present invention may also comprise a single leg 14 provided for carrying a terrain reference means 46 such as steel extension tape which may be secured to the terrain in any suitable manner, the leg 14 being moved about and the vertical angles V and horizontal angles H measured relative to the positions of the leg 14 and the tape 46. The structure of this embodiment offers the flexibility of having larger spacing between measuring points, if desired, and may enable the sampling of the sensors at each rotation to record the angles. This structure also provides an instrument which is even lighter in weight than the embodiment illustrated in FIG. 1.

While various preferred embodiments of the present invention have been described, other variations and modifications will naturally occur to those skilled in the art from a perusal hereof. It is therefore to be understood that the embodiments described are illustrative only and that the scope of the invention is to be defined solely by the appended claims when accorded a full range of equivalents.

What is claimed is:

1. A one-man field survey instrument comprising:
   a terrain engaging structure having two spaced-apart legs and means coupled thereto for maintaining the two legs parallel at all times, said structure being sufficiently small in size and light in weight to be moved by one man across the terrain with one or the other of the two legs in contact with the terrain;
   means carried by said structure for sensing the vertical orientation of said legs and for providing an enabling signal responsively thereto;
   means carried by said structure for measuring the vertical angle between predetermined points on said legs responsively to said enabling signal;
   means carried by said structure for measuring the azimuth of said legs responsively to said enabling signal;
   indication means carried by said structure for indicating the provision of said enabling signal;
   a recorder for storing signals related to measured vertical angles and azimuths; and
   a source of electrical power carried by said structure and operatively coupled to said recorder and to said sensing means, said measuring means, and said indication means
   whereby said structure may be moved by one man across the terrain to be surveyed with one of the two legs on the terrain at all times, passing the legs through the vertical at each position when both legs are in contact with the terrain whereupon the vertical angle and azimuth of the structure is recorded and the operator signaled to move one of the legs to a new position in contact with the terrain.

2. A survey system comprising the survey instrument of claim 1 and a data processor for providing from the recorded signals a topographical map of the terrain over which said instrument has been moved.

3. The system of claim 2 wherein said data processor is remote from said instrument.

4. The system of claim 3 wherein said data processor is coupled to said instrument by electromagnetic wave energy.

5. The system of claim 2 wherein said data processor is carried by said instrument.

6. A field survey instrument for measuring elevational variations in terrain comprising:
   a first leg adapted to contact the terrain;

a second leg adapted to contact the terrain, said second leg being parallel to said first leg;

means for determining when said legs are vertical;

means responsive to said vertical leg determining means for measuring the vertical angle relative to pre-selective points on said legs and the horizontal angle relative to said legs and a selected reference point spaced from the instruments; and means for storing the measured angles whereby said legs may be positioned vertically on the terrain to measure the vertical and horizontal angles therebetween and thereafter be swung repeatedly, one about the other, to selected new vertical positions without regard to variations in said terrain, measuring the vertical and horizontal angles at each new vertical position of the legs for use thereafter in interpreting the topographical features covered by the survey.

7. The instrument of claim 6 also comprising a magnetic compass for initializing said reference point in relation to a polar reference whereby horizontal angles may be measured as azimuthal angles.

8. The instrument of claim 6 wherein said storing means is carried by one of said legs.

9. The instrument of claim 6 wherein said storing means includes means carried by one of said legs for transmitting data related to said measurements and means remote from said instrument for receiving and storing the transmitted data.

10. The instrument of claim 6 also comprising a crossbar linkage for maintaining said legs parallel.

11. The instrument of claim 6 also comprising means for processing said measurements into a visual and coordinate display of the topographical features of the terrain surveyed.

12. A method of conducting a small scale topographical survey comprising the steps of:
(a) providing a pair of spaced-apart, parallel, terrain contacting legs;
(b) placing one leg on a starting point of the terrain to be surveyed;
(c) placing the second leg on a second point of the terrain to be surveyed;
(d) positioning said legs vertically to thereby enable the measurement of angles
(e) measuring the vertical angle between the legs and the azimuth of the line between the legs relative to a predetermined reference while enabled by the vertical post coming of said legs;
(f) recording the measured angles;
(g) swinging one leg about the other to additional points of contact with the terrain with one leg in contact with the terrain at all times and repeating steps (d) and (e) above at each such point of contact; and
(h) processing the measured angles to provide an approximation of topographical features covered by the survey.

13. The method of claim 12 wherein one of the previous points of contact is repeated to evaluate the accuracy of the measurements at intervening points of contact.

* * * * *